(12) United States Patent
Ooms

(10) Patent No.: US 7,881,279 B2
(45) Date of Patent: Feb. 1, 2011

(54) TELECOMMUNICATIONS NETWORK AND A PACKET HEADER USING LOCAL NODE IDENTIFIER INFORMATION TO DESIGNATE ROUTING INFORMATION

(75) Inventor: Dirk Eugène Ida Ooms, Antwerp (BE)

(73) Assignee: Alcatel, Paris (FR)

( * ) Notice: Subject to any disclaimer, the term of this patent is extended or adjusted under 35 U.S.C. 154(b) by 1376 days.

(21) Appl. No.: 10/316,027

(22) Filed: Dec. 11, 2002

(65) Prior Publication Data

US 2003/0118051 A1 Jun. 26, 2003

(30) Foreign Application Priority Data

Dec. 12, 2001 (EP) .................................. 01403222

(51) Int. Cl.
*H04L 12/28* (2006.01)
*H04J 3/24* (2006.01)
*G06F 15/173* (2006.01)

(52) U.S. Cl. ...................... 370/351; 370/392; 370/474; 709/238

(58) Field of Classification Search ................ 370/216, 370/225, 241, 242, 389, 392, 351, 465, 328, 370/349, 400, 409, 474, 475; 709/227, 238, 709/239

See application file for complete search history.

(56) References Cited

U.S. PATENT DOCUMENTS

| | | | | |
|---|---|---|---|---|
| 5,477,536 A | * | 12/1995 | Picard | 370/400 |
| 5,487,064 A | * | 1/1996 | Galand et al. | 370/392 |
| 5,721,820 A | | 2/1998 | Abali et al. | |
| 5,848,242 A | * | 12/1998 | Behaghel et al. | 709/218 |
| 6,108,710 A | * | 8/2000 | Brabson et al. | 709/241 |
| 6,683,865 B1 | * | 1/2004 | Garcia-Luna-Aceves et al. | 370/349 |
| 6,704,301 B2 | * | 3/2004 | Chari et al. | 370/351 |
| 6,765,896 B1 | * | 7/2004 | Ahmed et al. | 370/338 |

FOREIGN PATENT DOCUMENTS

EP 1 164 754 A1 12/2001
WO WO 01/30034 A2 4/2001

\* cited by examiner

*Primary Examiner*—Nittaya Juntima
(74) *Attorney, Agent, or Firm*—Sughrue Mion, PLLC

(57) ABSTRACT

A packet header for a data packet (14) includes a routing information field for containing at least one local node identifier data which identifies one or more nodes through which the data packet is intended to be transported. The packet header further contains a pointer field containing a pointer (PTR), which pointer indicates the position of individual local node identifier data in the routing information field. The pointer is operable to be incremented at each node so as to indicate the position of data, which identifies the node to which the data packet is to be subsequently transported.

28 Claims, 5 Drawing Sheets

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     LEN       |     PTR       |  LEN'th LNI |  | LEN-1'th LNI| |
+-+-+-+-+-+-+-+-+-+-+-+-+-+-+-+-+-+-+-+-+-+-+-+-+-+-+-+-+-+-+-+-+
|     ...       |  1st LNI|     |     (padding to 32 bit)       |
+-+-+-+-+-+-+-+-+-+-+-+-+-+-+-+-+-+-+-+-+-+-+-+-+-+-+-+-+-+-+-+-+
```

0xxx

10xx xxxx 110x xxxx xxxx

| Router ID of neighbor | LNI | C's interface towards neighbor | interface of neighbor |
|---|---|---|---|
| B | C1 | 10.1.0.2 | 10.1.0.1 |
| G | C2 | 10.1.0.2 | 10.1.0.3 |
| D | C3 | 10.2.0.1 | 10.2.0.2 |
| H | C4 | 10.2.0.1 | 10.2.0.3 |

TELECOMMUNICATIONS NETWORK AND A PACKET HEADER USING LOCAL NODE IDENTIFIER INFORMATION TO DESIGNATE ROUTING INFORMATION

The present invention relates to a packet header for a data packet, and more particularly to a packet header associated with the forwarding of a data packet through a telecommunications network. It also relates to a telecommunications network and to a node comprised in the telecommunication network.

Since a given two computer networks may typically possess quite different architectures, and therefore different data transmission and communication protocols, it is generally not possible to transmit/communicate data directly between those networks. Such networks are known as heterogeneous networks. An aim of inter-networking is to provide a method of packet communication that permits an application running on a first computer on one network to send information to or generally to communicate with a second computer on a different heterogeneous network.

These aims are typically achieved by use of Internet Protocol (IP) software which provides a uniform addressing scheme between heterogeneous networks so as to permit packet communication therebetween. Data packets transported across networks using IP are often referred to as IP datagrams, and these typically consist of a header followed by a data area or 'payload'. The header contains information pertaining to the route to be taken across the inter-network, such as the IP address of the node (computer) that originated the message and the IP address of the destination node (computer). The data area contains the data to be transported.

As is well known in the art, Internet nodes called 'routers' or 'gateways' implement internet protocol to forward datagrams/packets between networks and are arranged to physically interconnect heterogeneous networks.

Two basic forms of communication protocol are in wide use in today's communication networks for transporting data packets. These are known generally as Connection-Oriented (CO) and Connection-Less (CL) transport protocols. The former uses a connection identifier in the packet header while the later uses a destination address in the packet header.

In both CL and CO networks a 'forwarder' in a given node (including a router) serves to forward that packet, incoming to that node on an 'input port', to an output port of that node from which the packet may be output. The forwarder forwards the packet from the input port typically, in the case of CO, by obtaining network connection information from the packet header in order to determine the appropriate output port to output the packet on.

In CO transport, nodes (e.g. the source and destination) must first establish a connection before sending data across that connection. A network operating under such protocol is characterized in that a connection table must be kept in the network nodes. The connection table translates some connection identifier together with the input port into a new connection identifier and the output port and as such determines the path to be taken by the packet through the network (or networks). Each data packet transported across the network(s) must contain a Connection Identifier (CID) in its header. The CID is used by a given network node, as the packet is transported through the network, to index the connection table so as to determine the address of the subsequent node to which the packet should be transported or to determine the appropriate output port from which to output the packet. ATM and MPLS are examples of CO networks.

In practice the size of a CID is limited by the computational power or memory of the forwarder in a node. As a result available CID space is often too limited to build a full mesh of network connections for example. Furthermore, when processing a CID a node must generally process all the data bits within the CID when forwarding.

In a CL network, instead of using a CID, only a destination address is looked-up (by a node forwarder) in a routing table using a longest-prefix match operation. However, although CIDs are not required, this look-up operation is generally more complex than that required in CO networks.

It has to be remarked here that with a CL network according to a predefined destination address in a routing table the output port is selected independent of the source of the packet. This means an intermediate node for a packet originating at a first source or at a second source will always select according to this routing table, an identical output port. In this way a CL network is limited. It does not allow having independent paths for each source-destination pair.

Still another method is the well-known method of IP Strict Source Routing (SSR) in IP protocols. In this method, a packet header is attached to a data packet. This header provides, amongst other things, a pointer field and a list of IP addresses that are called routing information field. The routing information field comprises a series of IP addresses, each 4 octets (32 bits) in length, which each correspond to an address of a node (e.g. router) on a network (or inter-network). The pointer field contains a pointer that points in to the route data indicating the position of the next IP address to which the packet is to be sent on its route to the destination address (also provided in the header). A given node reading this information will act accordingly, thus, strict source routing provides a means for the source of an IP packet to supply routing information to be used by relevant nodes in the network in forwarding a packet to its destination.

The method is known as strict source routing since the router or host internet protocol must send the packet directly to the next address in the route data field, and must do so only through the directly connected network indicated by the pointer. A drawback of SSR is that it requires the use of globally unique IP addresses in the routing data field of the header. These addresses are costly of header space (high header overhead) and processing resources of a forwarder. This is generally undesirable.

U.S. Pat. No. 5,721,820 discloses a method for adaptive routing of messages in a computer network. Each message packet comprises a packet header that contains routing information, followed by the packet data. A source processor places route words in the packet header which route words identify the path which the message packet will follow. As the message packet traverses the network it is passed between switches and each switch receiving the packet examines the first route word to determine which output port of the switch the packet is to be routed to. The switch then deletes the first route word before forwarding the packet to the next network element. Therefore the next route word becomes the first route word and the switch receiving the packet will use that route word. Thus a packet has no route words left upon arriving at the destination processor. In an alternative the route words are proceeded by a route word identifier that points to the current route word, and instead of removing the first route word in each packet, each switch which the message packet passes through increments this identifier.

A disadvantage of the system described in U.S. Pat. No. 5,721,820 is that it is not suitable for use with networks having multi-access links, such as Ethernet, since they allow different nodes or switches to be reached via the same output port. It will be appreciated that specifying the output port to be used by a multi-access link node will be of no use in directing a message packet as that output port leads to several different nodes.

It is an object of the present invention to overcome at least some of the deficiencies of prior art transport protocols. The present invention aims to do so by providing a transport protocol that, for example, may provide a look-up operation less complex than that of CO protocols and obviously also less complex than that of CL. The present invention may also allow to have independent paths for each source-destination pair. Furthermore, the present invention requires less header overhead and less processing power as strict source routing. The present invention can also be used with multi-access links, such as Ethernet or Wireless LAN (IEEE 802.11), which allow more than one node to be reached from a given output port.

According to a first aspect of the present invention, there is provided a packet header for a data packet to be transported via at least one node of a network wherein the packet header includes;
 a routing information field for containing data associated with the at least one node, characterised in that;
 the data associated with the at least one node is local node identifier data which identifies a neighbouring node of the at least one node through which the data packet is intended to be transported.

It is to be understood that the term network is intended to cover both local networks and inter-connected (e.g. heterogeneous) networks, and the term node may be applied to any node of either type of network and also to a node in a multi-access link.

Thus, it will be understood that, according to the first of its aspects, the present invention employs local node identifier (LNI) data of a given node (or nodes) of a network for the purposes of providing routing information for a data packet. Note that no IP addresses are used as in the CL, CO and SSR prior art discussed above. Neither are port identifiers used as they are not suitable for multi-access links. Instead the invention employs local node identifiers which are only locally valid.

In some embodiments, the local node identifier(s) (LNI) is/are assigned to the neighboring node(s) by the at least one node. For example, referring to a router operable to implement the present invention as an "SLF router" (StateLess Forwarding (SLF)), when a given SLF router boots it identifies, via a "hello" mechanism (e.g. an OSPF Hello message), all of the neighboring routers connected to it. The given SLF router will then assign a number or symbol to each of the neighbors so identified, and each such number or symbol serves as the local node identifier (LNI) for the neighboring router to which such number has been assigned. Typically, the given SLF router will merely assign the number 1 (one) to the first identified neighbor, the number 2 (two) to the next identified neighbor, and so on. These numbers or symbols are 'local' identifiers in the sense that they are assigned to a neighboring node by a node and only have semantics (i.e. are meaningful) for the node that assigns the identifier.

It is to be noted that a local node identifier may be used to identify a neighbouring node, which comprises a plurality of, or group of, sub-nodes, or may be assigned by a node comprising a plurality of sub-nodes to identify a node which neighbours the assigning node. Furthermore, a 'neighbouring node' of a given node is preferably a node connected to the given node by a network/inter-network connection within which there are no intermediate nodes present.

It is to be noted that it is well known in the art to exchange information between routers/nodes of a network which indicates the link states between those routers/nodes. The method by which this is achieved is known as LSA (Link State Advertising) whereby each router originates one LSA message that describes the list of its own interfaces with other nodes in the network. According to the present invention, LSA may be extended so as to exchange not only link states between routers/nodes, but also to exchange local node identifiers (LNI) and information indicating which routers/nodes are SLF-aware.

Since the local node identifiers, which are only locally valid, typically require less space than full IP addresses, the packet header overhead is reduced compared to previous technologies, which used full IP addresses in the packet header. Furthermore as the local node identifiers do not specify a particular output port of a given node, but may merely specify the next node to which the packet is intended to be forwarded from the given node (the "next-hop"), a packet header according to the present invention is suitable for use in networks including multiple-access links.

Typically, the LNI will be distributed together with routing information such that they may be used as far as the routing protocol is distributing them over the network. The distribution with routing information works particularly well with link-state routing protocols (e.g. OSPF). Since link-state protocols are typically used intra-domain, the most probable usage of LNI will be within one network.

An example of the distribution of LNI "next-hop" identifiers together with routing information could be: an OSPF router receives link-state information from other routers in the network and subsequently builds a spanning tree (or "shortest-path tree") which contains the shortest path to all other routers. If the LNI "next-hop" identifiers are distributed together with the link-state information, this permits a node to read from the spanning tree which LNI "next-hop" identifiers to use to define a path to a particular destination node.

Preferably, the packet header according to the first aspect of the invention provides local node identifier data wherein the node identified by the local node identifier data is the node to which the data packet is to be transported to after reaching said at least one node of the network which the data packet is to be transported through.

Thus, the forwarder in the node(s) of a given network is able to forward the headed data packet to a neighbouring node appropriate to the route intended to be taken by the packet.

The neighbouring node may be a node reached via a multi-access link such as Ethernet.

More preferably, the packet header for a data packet, according to the first aspect of the present invention, provides a routing information field containing data associated with a plurality of nodes of the network, and wherein;
 the data associated with the plurality of nodes is a list of local node identifiers each local node identifier identifying a node through which the data packet is intended to be transported, and wherein;
 the packet header contains a pointer field for containing a pointer, which pointer is operable to indicate the position of an individual local node identifier in the routing information field;
 the pointer being operable to be incremented at each node so as to indicate the position of a local node identifier which identifies a node to which the data packet is to be subsequently transported.

In other words the packet header contains a list of local node identifiers, each specifying the next-hop in a specific node along the path. This list is used as routing/forwarding data and on receipt of the data packet by a given node, that node determines from the local node identifier list in the packet header, the appropriate neighbouring node to which it is intended to forward the packet. The packet can thus be transported through the network by each consecutive receiving node.

Accordingly, it will be understood that the routing information field provides routing information through a plurality of the nodes of a given network by listing the nodes through which the data packet should be transported in order to follow the route towards the destination node. In order that any one node may determine the relevant neighbouring node to which the packet is to be forwarded, a pointer is provided in the packet header to point to the relevant local node identifier (associated with the relevant neighbouring node) in the routing information field when the packet is received at the given node. Thus, the node is able to determine which neighbouring node to send the packet to. Once this has been ascertained, the pointer may then be incremented by the node, prior to outputting, so as to point to the relevant neighbouring (or next-hop) node identifier associated with the next node to which the packet is to be subsequently sent. Clearly, when the next and further subsequent node repeat this operation, the packet will traverse the path contained in the routing information field of the header.

This is based on the premise that the pointer is incremented just prior to outputting the data packet to the next node. However, it would be possible to increment the pointer just after reception of the data packet by a node. For example, a data packet is transported via nodes A, B and C. When the data packet is received by node A the pointer in its packet header points to node B, accordingly node A prepares the packet for output to node B, but just prior to output the pointer is incremented so that it points to node C. However, it would be possible to use the following alternative technique: when the data packet is received by node A the pointer in its data packet points towards node A, shortly after reception by node A the pointer is incremented so that it points to node B, the packet is then output to node B, shortly after reception by node B the pointer is incremented so that it points to node C etc.

Also, it would be possible to delete individual local node identifiers from the front of the header when the relevant node has been reached rather than using a pointer.

Ideally the packet header for a data packet includes a length field for containing a quantity representing the number of local node identifier data items contained within the routing information field.

Preferably, in the packet header according to the first aspect of the present invention, the routing information field may be modified (at a current node and prior to transmission therefrom) by replacing the local node identifier data ('local' with respect to the current node) associated with the next-hop node with local node identifier data ('local' with respect to the next-hop node) which identifies the current node. (Note: a node X may be aware of the local node identifiers used by its neighbours to identify the node X).

Thus it will be understood that a record of the reverse path for the route may be recorded in the routing information field as the packet progresses along its route through the network. Clearly, this reverse route may be used by the packet to subsequently retrace its route (in reverse) through the network to the source (originating) node.

According to a second of its aspects, the present invention provides method of transporting a data packet via at least one node of a network wherein the method includes the steps of;

providing a packet header for the data packet;

providing routing information in the header which routing information contains port identifier data which identifies a port of the at least one node through which the data packet is intended to be transported;

transporting the headed data packet via the at least one node of a network in accordance with the routing information such that the at least one node of the network transports the data packet through the port identified by the port identifier data.

Thus it will be understood that the neighbouring node identified by the local node identifier data is the "next-hop" node to which the data packet is intended to be transported after passing through said at least one node of the network which the data packet is to be transported via.

The neighbouring node may be a node reached via a multi-access link such as Ethernet.

Ideally, this method further includes the step of;

providing routing information containing data associated with a plurality of nodes of the network, wherein the data associated with the plurality of nodes is a list of local node identifiers, each local node identifier identifying a neighbouring node for a node through which the data packet is intended to be transported, and;

providing the packet header with a pointer;

indicating with the pointer the position of an individual local node identifier in the routing information;

incrementing the pointer at each node so as to indicate the position of a local node identifier which identifies a node to which the data packet is to be subsequently transported.

The invention, according to the second of its aspects, may further provide a method of transporting a data packet wherein, at a current node and prior to transmission therefrom, the method further includes the step of;

modifying the routing information by replacing the local node identifier data associated with the current node with local node identifier data identifying the previous node from which the data packet was received at the current node.

It has to be explained that different ways are possible to obtain the routing information by a node. A possible way is making use of the method known as Link State Protocol. Indeed, by extending the Link State Protocol with local node identifier information and thereby determining which nodes a given node is coupled, a node according to the invention is able to construct the routing information field.

Another way is making use of a scout packet. Indeed, in the method of transporting a data packet, according to the second aspect of the present invention, the routing information is obtained by;

providing a scout packet at a given node which packet is operable to record the route it takes through a network and information relating to the topology of the network;

transmitting such a scout packet in to the network from the given node of that network;

receiving the scout packet at a second node after the packet has been transmitted through the network;

retrieving the route and network topology information recorded by the scout packet and using that information in the compilation of routing information.

Thus it will be appreciated that such a scout packet may provide information enabling an appropriate or optimal route from packet source to destination. For example, changes in network topology (e.g. network connections) may be monitored and the routing information in subsequent packet headers may be modified accordingly. Ideally, the said given node and the said second node may be the same node such that a scout packet is both transmitted and received by the same node.

Preferably, when a node is unable to transport a data packet directly from a first node, to a second node (the first node being the current node and the second node being the intended next node);

the routing information in the header is modified by replacing the local node identifier data which identifies the intended next node as a neighbouring node of said first node, with additional routing information;

which additional routing information routes the data packet to the intended next node via an alternative route e.g. via at least one additional node or via a parallel link.

Thus, should the link associated with the intended output port of a given node be un-usable (e.g. a link failure occurs), the second aspect of the invention may provide a method whereby a data packet may be transported from the given node to the intended subsequent node (which would otherwise have received the packet via the un-usable link). It will be understood that this is achieved by re-routing the data packet around a failed link in the network. That is to say, the given node chooses the route to be taken around the un-usable link, using the network topology information available to it, and compiles the routing information to be placed in the header accordingly.

Preferably, in accordance with the second aspect of the present invention, the packet header may be removed from the data packet at a node in a network. Ideally, subsequent to removal of the packet header, the data packet may be further transported through the network in accordance with another packet transport protocol.

Thus, the packet may be stripped of the header (of the present invention) at a given node and subsequently transported across the network using, for example, a standard IP protocol. This ensures that, should the routing information in the packet header provide only a partial route or a segment of an intended route, the data packet may still be transported through the parts of the network not included in that partial route (i.e. the rest of the full route) once that partial route has been traversed. Clearly, this represents a form of mixed routing.

Furthermore, in accordance with any of its aspects, the present invention provides a telecommunications network including at least one node operable to receive and process data packets possessing a header according to any aspect of the present invention. Preferably, this header is compiled by a node containing port identifier data for a number of the at least one nodes of the network.

Thus, it will be understood that a node originating a data packet, headed in accordance with any aspect of the present invention, compiles the route to be taken by the packet in accordance with a set of local node identifier data items (associated with nodes of the network) known to that originating node. That is to say, the originating node chooses the route to be taken, using the information available to it, and compiles the routing information to be placed in the header accordingly.

The present invention will now be further illustrated by way of non-limiting examples and embodiments, with reference to the following drawings:

FIG. 3 illustrates a network of nodes and the transportation of a headed packet there through;

Figures 1, 2:
FIG. 1 illustrates an example of a header according to the present invention.
FIG. 2 illustrates a system by which local node identification data items may be encoded in the header.

Referring to FIG. 1, there is illustrated an example of an encoding format for a header according to the present invention. Hereafter, such a header shall be referred to as a 'SLF-header' for the purposes of clarity.

The SLF-header, according to the present embodiment, consists of an array of lines, each 4 octets (32 bits) in length, with three distinct fields, the 'LEN' field, the 'PTR' field and the 'LNI' field.

The first field in this header is denoted 'LEN' in FIG. 1. This field, occupying one octet of the header, contains the length (in octets or in the number of local node identifiers included) of the whole SLF-header. Thus, the value LEN+1 refers to ('points' to) the position, in the packet, at which the payload of the packet begins (i.e. immediately after the header ends). For example, the payload may begin with a further header (e.g an IP header).

The second field in the header, denoted 'PTR' in FIG. 1, contains a pointer. This pointer field is also 1 byte in length and contains a pointer which points to a given 1-byte word in the LNI field. The LNI field contains a sequential array of local node identifier (LNI) data items, each one byte in length, which each identify a neighbouring node of a given node in the network. The local identifiers used to identify these nodes are not full IP address headers, but rather only locally valid node identifiers each assigned to a neighbour of a given node to.

These LNI define the intended route to be taken by the SLF-headed packet when being transported through the nodes of a network. That is to say, the LNI field is equivalent to a packet routing information field. The pointer therefore points to a given item (i.e. a LNI) in a routing information field and identifies a particular neighbouring node of a given node on that route. Note that the SLF-header may terminate with a number of bytes of padding so as to ensure that the header length is an integer multiple of 32 byte words.

Indeed, according to the present embodiment, when the pointer field is first read by the forwarder of a particular node, that pointer will point to the LNI of the node to which the packet is intended to be subsequently output. Prior to such output, the pointer 'PTR' is incremented so as to point to the next LNI in the LNI field.

By providing LNIs of length 1-byte, each such LNI may uniquely identify up to 256 output ports for a given node. Of course, a larger or smaller LNI size could be used according to the present invention, however, a larger LNI size would undesirably increase the header size (i.e. the LNI field) for a given number of LNIs. Conversely, a smaller LNI size would typically be harder to process. In order to be more flexible in the encoding of LNIs in an SLF-header, and to reduce the header overhead thereof, the present embodiment also provides a method of variable-length encoding of LNIs as follows.

Each item of local node identifier data is stored in the LNI field (i.e. the routing information field) with a binary prefix attached thereto such that;

if the prefix is binary value 0, then the local node identifying data is contained in the subsequent 3 bits of that item;

if the prefix is binary value 10, then the local node identifying data is contained in the subsequent 6 bits of that item;

if the prefix is binary value 110, then the local node identifying data is contained in the subsequent 9 bits of that item, etc.

Each additional binary digit of 1 which is added to the prefix binary value introduces an extension of 3 additional bits for the LNI data as can be seen from the three examples above. FIG. 2 illustrates these three examples.

Thus, the encoding 'class' of an encoded LNI is indicated by the first one or more bits thereof, and the LNI field may contain LNIs of variable length, e.g. half a byte, one byte, 1.5 byte or two bytes etc. Clearly, the pointer 'PTR' is to be incremented according to the class of the LNIs, so as to ensure that LNIs are pointed to sequentially.

It is to be understood that the SLF-header is intended to be attached as a header to any type of payload. Such a payload might be, for example, an IP datagram such that the payload also includes a header (i.e. the IP header) encapsulating another payload. Accordingly, to further illustrate the invention according to any of its aspects, there follows an embodiment wherein the payload of the SLF-header is just such an IP datagram wherein the SLF-header is implemented as a layer below IP. The header may contain a field (not shown) which contains data identifying the next (i.e. higher) layer protocol, such as IP. In addition, a reserve field could also be inserted between the "LEN" field and the "PTR" field to allow either the room to expand as and when required.

Figure 3:
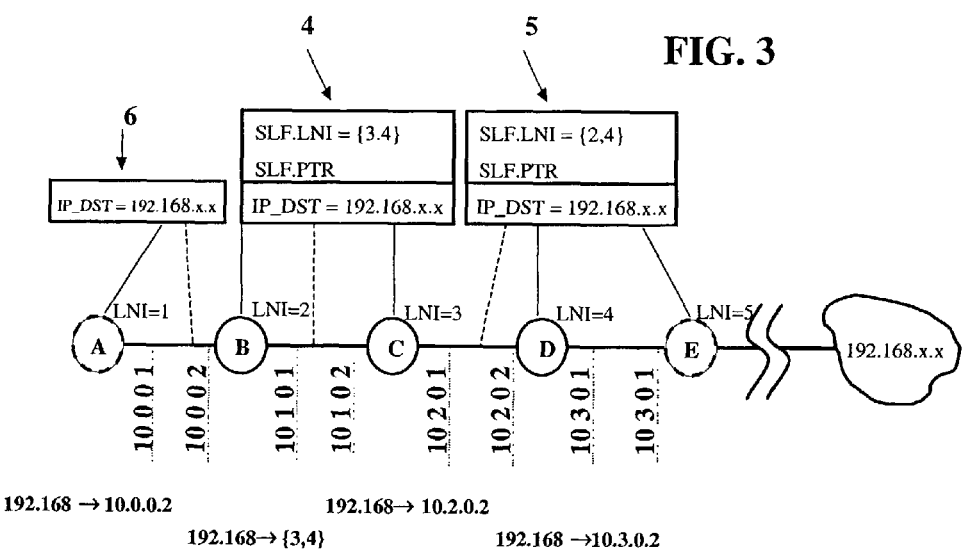

Referring to FIG. 3, there is illustrated a network of consecutive IP routers denoted A, B, C, D and E. Routers B, C and D are said hereafter to be 'SLF-aware'. That is to say, while all of the routers are IP routers, only the routers B, C and D are capable of compiling and meaningfully processing SLF-headers and, hereafter, shall be referred to as 'SLF routers'.

To be a SLF router, a given router (or more generally a given node) must have available to it, or be capable of receiving, a number of LNI associated with other SLF-aware nodes in the network with which it can construct a LNI list (to put in the LNI field of the SLF-header). Put another way, a SLF router/node is a router/node able to so define a valid route intended to be taken by the SLF-headed packet when being transported through the nodes of the network.

Returning to FIG. 3, a source IP router A possesses a port which is connected to an input port of SLF router B. Router A transmits an IP datagram 6 to SLF router B with a forwarding entry (destination IP address) in the IP header denoted 'IP_dest=192.168.x.x'. The IP datagram 6 is received by an input port of SLF router B, the router reads the IP destination address for that datagram and then proceeds to calculate a valid route towards that destination in terms of LNI of other connected SLF-aware nodes in the network. Typically, the path so constructed would be a shortest-path route via those nodes (e.g. the routers occupy an OSPF Open Shortest Path First area), however, the present invention is not intended to be limited to such routes. In the present example, the route is denoted {3, 4} and indicates that nodes C and D (having LNIs 3 and 4 respectively) are to be used when transporting the SLF-headed packet ('SLF packet') through the network.

It has to be remarked that according to another implementation and since node B has to execute some routing processing anyway, LNI=3 relating to the 'next-hop' (router C) is not necessarily required in the routing information field.

The route so calculated is placed in the LNI field of a SLF-header and the SLF header, complete with LEN and PTR fields, is used to encapsulate the IP datagram. Router B then determines, with the pointer in the SLF-header, which neighbouring node to transmit the SLF packet to. This may entail determining which of the router's output ports to transmit the SLF packet through. The router then increments the pointer (so as to point to LNI=4) before outputting the SLF packet 4. Thus, having been output of router B through an appropriate port, the SLF packet is subsequently received at an input port of router C.

Router C reads the SLF header of the SLF packet. The pointer PTR having been previously incremented now points to LNI=4. Accordingly, the router determines that the SLF packet is to be output to router D and towards router D. Were the LNI field to contain more than two LNIs (or were there to be more than three linked SLF routers), the router C would then increment the pointer PTR so as to point to the next LNI in that list before outputting the SLF packet to the next SLF router. However, in the present example, the pointer in the SLF header received by router C already points to the terminal LNI in the LNI field. This implies that the router to which the SLF packet is to be sent, from router C, is the terminal SLF-aware router in the local route (i.e. router D).

Thus, it will be understood that in such a case it is not necessary to increment the pointer PTR prior to output to such a terminal SLF router, since there will be no LNI in the LNI field associated with that router. Furthermore, SLF-headed packets will not be output from a terminal SLF router to a non-SLF router since, clearly, the latter type are not SLF-aware and thus are incapable of processing SLF headers.

It has to be remarked that according to another example the LNI field could include a LNI for router E and that the SLF packet output from router C could then point to that LNI. When the SLF packet is received router D could then read that LNI before stripping the SLF header off of the SLF packet. The router would then know which node to output the IP packet to and would still only have used the SLF protocol.

Consequently, the pointer PTR is set to 0 (zero), or some other predefined symbol, so as to indicate this condition to router D (i.e. that it is the terminal SLF router). As a result, on receipt of SLF packet 5 the router D strips that packet of its SLF header thereby revealing the original IP datagram. Subsequent packet transportation, from router D to router E takes place according to IP protocol. Of course, should that IP datagram encounter a further one or more SLF-aware routers before reaching destination address 'IP_dest=192.168.x.x', then the process of SLF header encapsulation and transmission, as discussed above, would be initiated once more.

In a further embodiment of the present invention, according to any of its aspects, there is provided a technique of 'Reverse Path Recording' (RPR) an SLF packet as shall be described below.

In general terms, this technique involves modifying the routing information at each SLF router/node, prior to transmitting the SLF packet from that node, so as to contain the route travelled by the packet in reaching the current node. This must be done without corrupting the routing information corresponding to the remaining un-travelled route.

Figure 4:
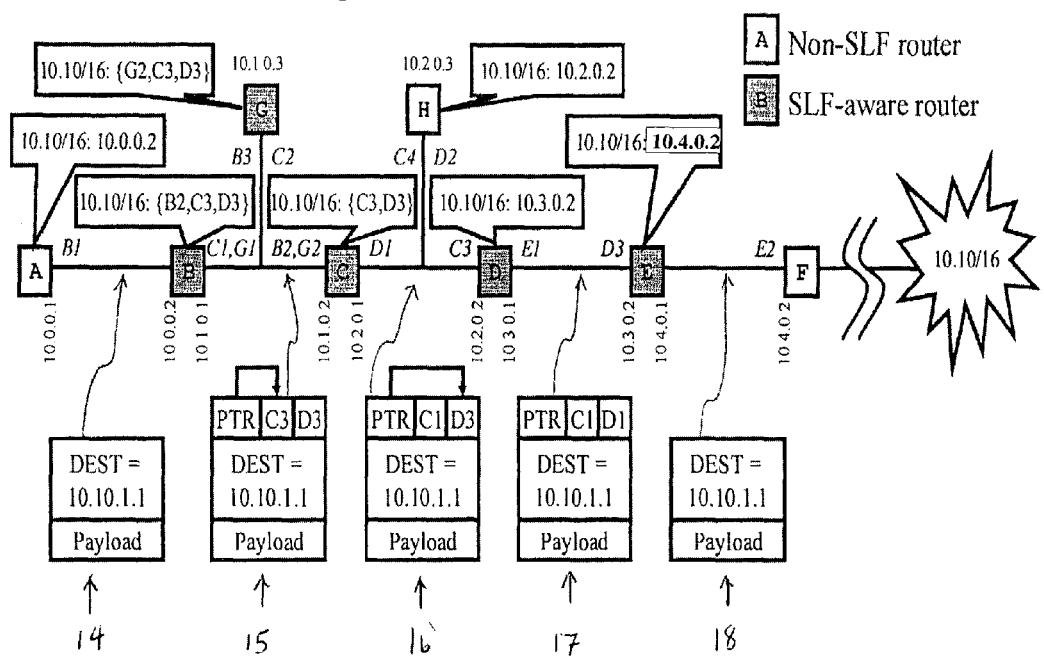
FIG. 4 illustrates an example of reverse routing.

FIG. 4 illustrates an example of how this may be done. Referring to FIG. 4, there is illustrated a network of IP routers including routers A, B, C, D, E, F, G and H. The routers B, C, D, E and G are SLF-aware, while routers A, H and F are not SLF aware. The links between B, C and G and between C, D and H are multi-access links and the symbols 'Xi' (where X=B, C, D, E or G, and i=1, 2, 3 or 4) are the local node identifiers (LNI) assigned by the SLF router 'X'.

Each router transmits an OSPF "Hello" message in order to enable LNIs to be formed. When an SLF router receives an OSPF message from a neighbouring node/router it is able to construct a table of local node identifiers in which each next-hop interface with another node is assigned an LNI. Note that LNIs are assigned to neighbours that are not SLF-aware (SLF capabilities are not announced via OSPF "Hello" messages). Each such SLF router assigns a locally valid identifier to each of the neighbouring routers connected to it (whether or not they are SLF aware) using a semantic valid only to the assigning router. For example, router C assigns LNI=C1 to identify neighbouring router B, LNI=C2 to identify neighbouring router G, LNI=C3 to identify neighbouring router D and LNI=C4 to identify neighbouring router H.

Figures 5, 6:
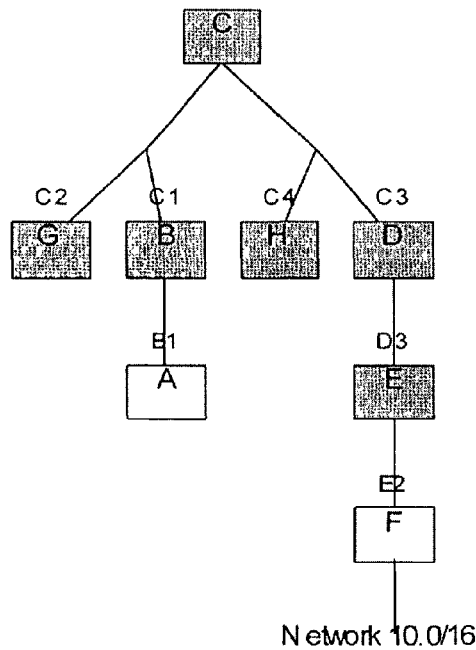
FIG. 5 illustrates a table of typical LNIs assigned by a given node to identify neighbouring nodes.
FIG. 6 illustrates an OSPF shortest-path tree containing the SLF information.

The table illustrated in FIG. 5 shows an example of a table of local node identifiers constructed by router C. An alternative way of obtaining such a table is via the router-LSAs. Each router originates one router-LSA that describes the list of its own interfaces (e.g. IP address). This has the advantage of yielding immediately the relation between the IP address of the interface (contained in each router-LSA) and the LNI (see fourth column in FIG. 5). All nodes of the network must learn that node C identifies interface 10.1.0.1 by LNI=C1, interface 10.1.0.3 by C2, interface 10.2.0.2 by C3 and interface 10.2.0.3 by C4, otherwise they (e.g. router E) will not be able to build an SLF path through router C.

The LNI information constructed by the various SLF routers in the network is communicated to other SLF routers in the network by 'flooding' the network with the information. The flooding of the LNI information is done via Opaque-LSA type 10 (area flooding-scope). Thus, each SLF router must be Opaque-LSA capable in this embodiment. Each router creates an Opaque-LSA to advertise its SLF information by forming an LSA packet the header of which identifies the originating router (e.g. router C) and the payload of which includes a list of the pairs:

<IP address, LNI> for each neighbour interface (see second and fourth column of FIG. 5). Accordingly, by flooding this information through the network, each Opaque-LSA capable router is able to know the IP address and LNI of each next-hop interface of all SLF routers in the flooded network. Each Opaque-LSA capable router may then map the SLF information on to a "shortest-path tree" and retrieve from this tree the explicit SLF path.

FIG. 6 illustrates the mapping of SLF information pertaining to router C's shortest-path tree. The directional nature of the tree means that, for example, the LNI=G2 does not appear in the tree since it is only related to forwarding done by router G towards router C. Note that routers A and F are not SLF capable, this is known to router C because router C will never have received an Opaque-LSA from either of routers A and F. Thus, as long an a node/router does not receive Opaque-LSAs from another node/router, the former node/router will not use the LNIs leading to that latter node/router (e.g. LNI=B1 and LNI=E2). Each SLF-aware router finally builds the SLF routing table from the information it has received.

Figure 7:
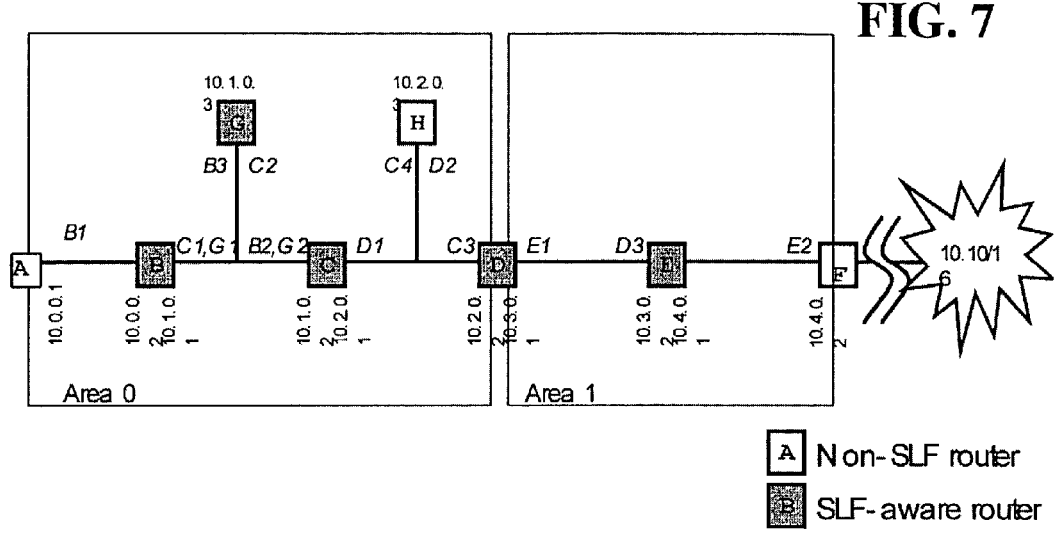
FIG. 7 illustrates two bordering OSPF areas.
Figure 8:
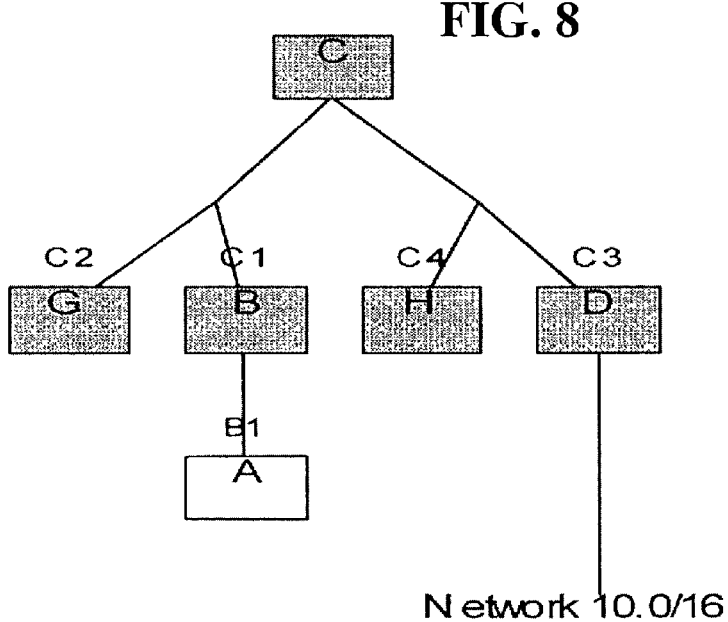
FIG. 8 illustrates a shortest-path tree for one of the routers illustrated in FIG. 7.

FIG. 7 illustrates two bordering OSPF areas each configured as described above (i.e. LNIs have been flooded through respective areas). The router D is an Area Border Router (ABR) which serves to summarise reachability information concerning Area 1 and floods that information into Area 0. The shortest path tree for router C will then be as illustrated in FIG. 8. Opaque-LSAs (type 10) are not flooded beyond the borders of the Area 1. Thus, no Area 1 SLF information is flooded into Area 0. For the inter-area routing case one can take two approaches:

1. SLF paths are not advertised outside their area. In this case SLF packets are terminated at the IP layer in the ABR and a partial SLF path can be used for the next part of the route.
2. It is allowed to advertise SLF paths outside their area. For this case an extension to OSPF can be defined. Normally inter-area OSPF advertises which network is reachable via which ABR, this information can be extended with the SLF path from the ABR towards the network.

Turning to FIG. 4, consider an IP datagram 14 output from router A to router B and destined for a particular IP destination address (denoted 'DEST=10.10.1.1'). Upon receipt by router B the datagram is encapsulated by a SLF header, thus producing a SLF packet 15. The header of this packet includes pointer PTR and LNI field {B2, C3, D3} and, prior to incrementation, PTR points to LNI=B2 identifying (in the semantic of router B2) the node (i.e. router C) to which the SLF packet 15 is to be forwarded. Thus router B directs the packet for output towards router C and, prior to output increments PTR, then outputs packet 15 accordingly.

This packet is received by router C on an input port of the latter. Once received, router C then replaces the LNI previously pointed to i.e. LNI=C3, for router D, with LNI=C1 for router B), thus yielding SLF packet 16 with a modified LNI field containing elements {C1, D3}. Subsequently, PTR is incremented and the SLF packet transmitted to router D whereupon it is received at the latter via an input port thereof. Router D then replaces the LNI last pointed to (i.e. LNI=D3, for router E) with that for router C (i.e. LNI=D1), thus yielding SLF packet 17 with a modified LNI field containing elements {C1, D1}.

Thus, it can be seen that both SLF packets 16 and 17 contain a route (in terms of LNI) to both the originating SLF node B and the destination node E. For either packet, the forward route may then be read (by e.g. a router) by incrementing the pointer PTR, while the reverse route may be read by decrementing PTR. Either packet may be forward routed or reverse routed by incrementing or decrementing PTR respectively.

Prior to transmission each of the routers C and D may store the respective forward and reverse routes. These routes may then be used in future SLF packet routing.

It is to be noted that it is well known in the art to exchange information between routers/nodes of a network which indicates the link states between those routers/nodes. The method by which this is achieved is known as LSA (Link State Advertising). According to the present invention, LSA may be extended so as to exchange not only link states between routers/nodes, but also to exchange LNI and information indicating which routers/nodes are SLF-aware.

Alternatively, the provision of link-state information for and in respect of SLF nodes, according to the present invention, may be achieved by employing a method hereafter referred to as 'packet scouting'. Packet scouting may be initiated by any one node of a network (a SLF node or otherwise) and involves the transmission of a 'scout request' from that node, i.e. the originating node, to some destination node of the network (a SLF node or otherwise). This scout request may be transmitted from the former to the latter by any transmission or communication means as would be known to a person skilled in the art but, typically, would be effected by transmission of a data packet (a SLF packet or otherwise).

The request includes the address of the originating node and, of course, the destination node.

Once the destination node receives the scout request it accordingly transmits a 'scout packet' back to the originating node. In the course of transportation across the network, the scout packet, so transmitted, may encounter a group of interconnected SLF nodes. These interconnected nodes may form part of the route followed by the scout packet, or may comprise the whole route. At each such SLF node the scout packet is recognised as being such and, accordingly, each SLF node in the group thereafter processes the SLF header of the packet (after encapsulation thereby) using the method of reverse routing, as described above, when transporting the scout packet through the group. Each SLF node in the group which is intermediate the first and the last nodes of the group, records the reverse-routing information of the SLF header attached to the SLF packet received by it. Thus, it will be understood that the reverse route so recorded corresponds to the reverse of the route taken in a direction from the node originating the scout packet to the node Receiving the scout request. Clearly, this route is equivalent to a forward route from the latter to the former. Thus, each SLF node having recorded the reverse rout information is thereby able to update its route information relating to that group.

Any subsequent groups so encountered by the scout packet would, obviously, be able to operate in the same fashion.

Note that, should all the nodes encountered by the scout packet be SLF nodes then the complete route taken by that packet would be available to the node originating the scout request. Furthermore, it is to be understood that the node originating the scout request could also be the node that receives the scout packet. That is to say, a given originating node may launch a scout packet in to the network, which scout packet is destined for that same node. This would, for example, allow an originating SLF node to determine the route information and network topology of the network local to it. This is particularly useful in re-routing SLF packets around failed links between SLF nodes as will now be discussed.

An SLF node can obtain the SLF path to a certain destination without the direct co-operation of a routing protocol. First, the SLF node sends a Scout Request towards a destination address (e.g. triggered by an IP packet to this destination). The Scout Request records the SLF path and the last network prefix towards the destination until it reaches the last SLF node (not necessarily the destination). The last SLF node sends a Scout Reply back to the first SLF node. The Scout Reply contains the SLF path and the network prefix, which was set by the last-but-one SLF node in the Scout Request. If an intermediate SLF node receives an SLF packet with a LNI that became invalid (due to e.g. a link failure), this can be signaled to the originating node with a Path Failure message. Several cases can occur:

1. RPR (Reverse Path Recording) disabled: the intermediate node sends a Path Failure towards the originating node containing the invalid SLF sub-path
2. RPR enabled and symmetrical paths: the intermediate node sends a Path Failure using the reverse path of the invalid SLF packet. When the Path Failure arrives at the originating node, it contains the invalid SLF sub-path.
3. RPR enabled and asymmetrical paths (in fact the following method is applicable to all cases): in this case the intermediate node does not know the invalid SLF sub-path, but it can send a Path Failure containing the final destination and, the hop number where the SLF path became invalid. The originating node can then derive the invalid SLF sub-path by consulting its forwarding table.

When the originating node receives a Path Failure message it can invalidate all SLF paths that contain the invalid SLF sub-path. It can then trigger new Scout Requests.

If a network topology change occurs inside a group of interconnected SLF nodes, e.g. due to link failure, the routing information contained in those nodes may be rendered invalid. There may be a significant amount of time during which a node originating an SLF packet is left unaware of this topology change and, during this time, would consequently launch SLF packets containing invalid routing information.

To overcome this problem the present invention, according to any of its aspects, provides a technique by which such an originating node may be informed of such a topology change, and by which link failures may be overcome.

Figure 9:
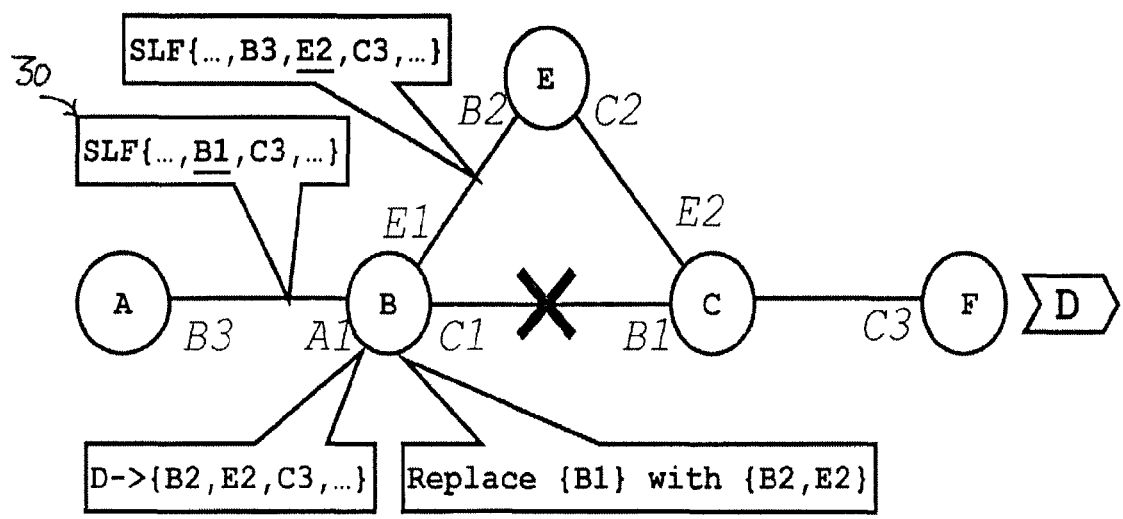
FIG. 9 illustrates an example of re-routing around a link failure in a network.

Accordingly, FIG. 9 illustrates a group of interconnected SLF nodes, denoted A, B, C, E and F. An SLF packet is launched on to the network from node A to node B and destined for a further node (not illustrated) situated beyond node F. The pointer in the SLF header of the SLF packet so launched points to LNI=B1 of the LNI field (underlined in item 30 FIG. 9), thus the SLF packet is intended, on receipt by node B, to be transported therefrom to node C. However, should the link between nodes B and C have failed (as in FIG. 9) such transportation would not be possible. In such a case, node B modifies the LNI field of the SLF packet received by it by replacing the LNI of the 'next hop' node to which the packet is to be next transported with two LNIs which define an alternative route to node C, via node E, which avoids the failed link. As can be seen in the present example, LNI=B1 for the originally intended direct route is replaced by LNI=B2 and LNI=E2 so that the packet can be indirectly routed to the node C.

Clearly, the packet could be re-routed via any number of suitable SLF nodes and the present invention is not intended to be limited to re-routing only via one additional SLF node as illustrated in FIG. 5.

The node B may obtain the necessary route information relating to node E by e.g. employing the method of packet scouting as discussed above. Furthermore, by employing reverse routing in SLF headers, node B is able to determine the reverse route of the packet arriving from node A (i.e. determine the route from B to A) and thereby signal to node A that the originally intended link between nodes B and C has failed. This signal may also include the re-routing information used by node B such that node A may update its routing information. The signal may be sent using a packet (SLF packet or otherwise).

It has to be remarked that a possible distribution of the SLF functionality in a telecommunication network could be as follows: comprising in routers at the edge of the network i.e. edge routers, extended route information and network topology information and comprising in routers in the core of the network i.e. core routers, only a limited route and network topology information of the network e.g. only related to its neighboring nodes.

The embodiments described herein merely provide examples of the inventive concept of the present invention and are not intended to be limiting. Variations and alterations to those embodiments, such as have been identified in the above description, may be made without departing from the scope of the invention.

The invention claimed is:

1. A telecommunications network comprising at least one node operable to receive and process data packets possessing a packet header for a data packet to be transported via said at least one node, wherein said at least one node has a multi-access link connected to several other nodes via a single output port, said multi-access link connecting said at least one node to each of said several other nodes without any intervening nodes, and wherein the packet header comprises a routing information field for containing data associated with the at least one node, wherein the data associated with the at least one node is local node identifier data which is only locally valid to identify a neighbouring node of the at least one node through which the data packet is intended to be transported.

2. A telecommunications network according to claim 1, wherein the neighbouring node identified by the local node identifier data is the node to which the data packet is to be transported after reaching said at least one node.

3. A telecommunications network according to claim 2, wherein:
   the routing information field contains data associated with a plurality of nodes,
   the data associated with the plurality of nodes is a list of local node identifiers each local node identifier identifying a node through which the data packet is intended to be transported, and
   the packet header contains a pointer field for containing a pointer, which pointer is operable to indicate the position of an individual local node identifier in the routing information field the pointer being operable to be incremented at each node so as to indicate the position of a local node identifier which identifies a node to which the data packet is to be subsequently transported.

4. A telecommunications network according to claim 3, wherein at a current node and prior to transmission therefrom, the routing information field is modifiable by replacing the local node identifier data associated with the current node with local node identifier data identifying the previous node from which the data packet was received at the current node.

5. A telecommunications network according to claim 1, wherein the header includes a length field for containing a quantity representing the number of local node identifiers contained within the routing information field.

6. A telecommunications network according to claim 1, wherein each item of local node identifier data is stored in the routing information field with additional data attached thereto to indicate the length of the local node identifying data item.

7. A telecommunications network according to claim 1, wherein the header is compiled by a node containing local node identifier data for a number of nodes of the network.

8. A telecommunications network according to claim 1, wherein said neighboring node is the next node through which the data packet is intended to be transported after said at least one node, said at least one node comprising:
   means for transporting the headed data packet via said at least one node in accordance with the routing information such that the at least one node of the network transports the data packet to the neighboring node identified by the local node identifier data; and
   means for replacing the local node identifier data with additional routing information and for using the additional routing information to route the data packet to the intended next node via an alternative route when said at least one node is unable to transport said headed data packet directly to said next node.

9. A telecommunications network according to claim 1, wherein said local node identifier data is not a complete IP address.

10. A telecommunications network according to claim 1, wherein said local node identifier data is assigned to said neighbouring node by said at least one node.

11. A telecommunications network according to claim 1, wherein said local node identifier data is recognized as identifying said neighbouring node only by said at least one node.

12. A first node in a telecommunication network, said network comprising said first node as well as several other nodes and wherein said first node comprises an output port connecting said first node to a multi-access link connected to said several other nodes of said telecommunication network, wherein said multi-access link connects said first node to each of said several other nodes without any intervening nodes, said first node further comprising a router function operable to receive and process data packets possessing a packet header for a data packet to be transported via said first node, and wherein the packet header comprises a routing information field for containing data associated with the first node, wherein the data associated with the first node is local node identifier data which is only locally valid to identify a neighbouring node of the first node through which the data packet is intended to be transported.

13. A node according to claim 12, wherein said telecommunication network includes a plurality of additional nodes each operable to receive and process data packets each possessing a respective packet header for a data packet to be transported via said each additional node, and each additional node connected via a single output port to a multi-access link which connects said each additional node to each of several other nodes without any intervening nodes, and wherein the packet header comprises a routing information field for containing data associated with said each additional node, wherein the data associated with the each additional node is local node identifier data which is only locally valid to identify a neighbouring node of the each additional node through which the data packet is intended to be transported, and wherein a header that is compiled by said first node is one of said respective packet headers and contains local node identifier data for at least one of said additional nodes of the network.

14. A node in a telecommunication network, said node being connected via a single output port to a multi-access link which connects said node to each of several other nodes without any intervening nodes and said node being operable to receive and process a data packet with a header containing routing information containing local node identifier data which is only locally valid to identify a neighboring node as the next node through which the data packet is intended to be transported, said first node comprising:
   means for transporting the headed data packet via said node in accordance with the routing information such that the node transports the data packet to the neighboring node identified by the local node identifier data; and
   means for replacing the local node identifier data with additional routing information and for using the additional routing information to route the data packet to the intended next node via an alternative route when the node is unable to transport said headed data packet directly to said next node.

15. A method of transporting a data packet via at least one node of a network, wherein said at least one node has a multi-access link connected to several other nodes via a single output port, said multi-access link connecting said at least one node to each of said several other nodes without any intervening nodes, the method comprising the steps of providing a header of said data packet with a routing information field for containing data associated with the at least one node, and transporting said data packet in accordance with said routing information, wherein said data is local node identifier data which is only locally valid to identify a neighboring node of the at least one node through which the data packet is intended to be transported.

16. A method according to claim 15, wherein said step of transporting said data packet in accordance with said routing information comprises:
   transporting said data packet such that the at least one node of the network transports the data packet to the neighbouring node identified by the local node identifier data.

17. A method of transporting a data packet according to claim 16, wherein the method further includes the steps of:

providing routing information containing data associated with a plurality of nodes of the network, wherein the data associated with the plurality of nodes is a list of local node identifiers, each local node identifier identifying a neighbouring node for a node through which the data packet is intended to be transported;

providing the packet header with a pointer indicating the position of an individual local node identifier in the routing information; and incrementing the pointer at each node so as to indicate the position of a local node identifier which identifies a node to which the data packet is to be subsequently transported.

18. A method of transporting a data packet according to claim 17, wherein at a current node and prior to transmission therefrom, the method further includes the step of: modifying the routing information by replacing the local node identifier data associated with the current node with local node identifier data identifying the previous node from which the data packet was received at the current node.

19. A method of transporting a data packet according to claim 16, wherein the routing information is obtained by;

providing a scout packet at a given node which packet is operable to record the route it takes through a network and information relating to the topology of the network;

transmitting such a scout packet in to the network from the given node of that network;

receiving the scout packet at a second node after the packet has been transmitted through the network; and retrieving the route and network topology information recorded by the scout packet and using that information in the compilation of routing information.

20. A method of transporting a data packet according to claim 19, wherein said at least one node comprises at least the second node.

21. A method of transporting a data packet according to claim 19, wherein said given node and said second node are the same node.

22. A method of transporting a data packet according to claim 16, wherein when a node is unable to transport a data packet directly to an intended next node:

the routing information in the header is modified by replacing a local node identifier which identifies the intended next node as a neighbouring node with additional routing information;

wherein the additional routing information is used to route the data packet to the intended next node via an alternative route.

23. A method of transporting a data packet according to claim 22, wherein routing information modification occurs in the event of a link failure between nodes.

24. A method of transporting a data packet according to claim 16, wherein the packet header is removed from the data packet at a node in a network.

25. A method of transporting a data packet according to claim 24, wherein subsequent to removal of the packet header, the data packet is transported through the network in accordance with another packet transport protocol.

26. A method according to claim 15, wherein said local node identifier data is not a complete IP address.

27. A method according to claim 15, wherein said local node identifier data is assigned to said neighbouring node by said at least one node.

28. A method according to claim 15, wherein said local node identifier data is recognized as identifying said neighbouring node only by said at least one node.

* * * * *